(No Model.)
S. ELLIOTT.
BALL BEARING FOR AXLES.
No. 483,836. Patented Oct. 4, 1892.
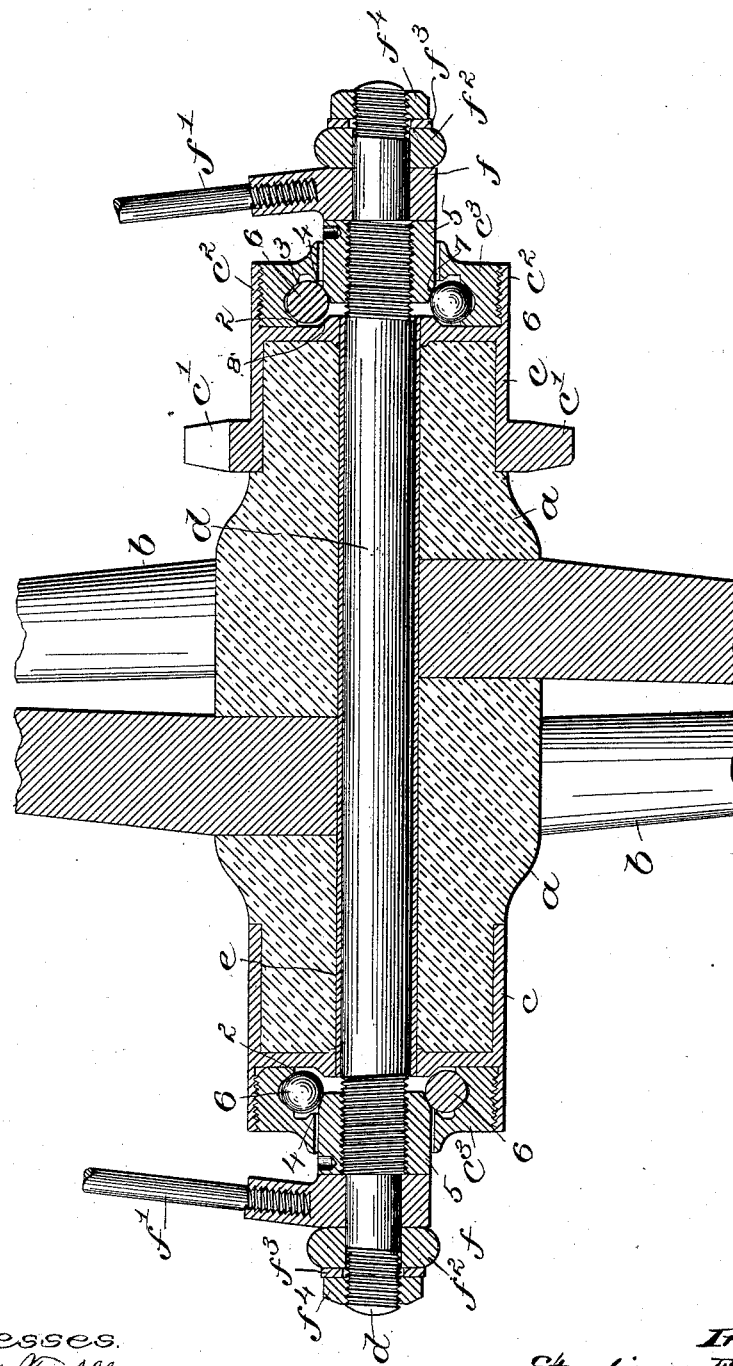
Witnesses.
Edward F. Allen.
Fred S. Greenleaf.
Inventor.
Sterling Elliott.
by Crosby & Gregory
attys.

UNITED STATES PATENT OFFICE.

STERLING ELLIOTT, OF NEWTON, MASSACHUSETTS.

BALL-BEARING FOR AXLES.

SPECIFICATION forming part of Letters Patent No. 483,836, dated October 4, 1892.

Application filed October 19, 1891. Serial No. 409,089. (No model.)

*To all whom it may concern:*

Be it known that I, STERLING ELLIOTT, of Newton, county of Middlesex, State of Massachusetts, have invented an Improvement in Ball-Bearings for Axles, of which the following description, in connection with the accompanying drawings, is a specification, like letters and figures on the drawing representing like parts.

This invention has for its object to improve the construction of ball-bearings for velocipedes and the like; and it consists in details of construction to be hereinafter pointed out in the claims at the end of this specification.

The drawing shows in horizontal section the hub of a wheel provided with ball-bearings embodying this invention.

The hub $a$ of the wheel and spokes $b$ may be of any well-known or suitable construction. A circular end piece $c$, made as a ferrule, is driven onto the end of the hub $a$, it having as a part of it or affixed to it sprocket-teeth $c'$ to form a sprocket-wheel. The said ferrule-like end piece is also provided with an internally-screw-threaded flange $c^2$, which receives an externally-screw-threaded recessed shell or disk $c^3$. The end of the ferrule-like end piece $c$ has a central opening for a tube $e$, which passes through the hub $a$, and the axle $d$ is contained within said tube $e$. The ferrule-like end piece is fitted snugly onto the tube $e$. The end piece is provided with an annular rib or projection 8, surrounding the opening for the tube $e$. The disk or shell $c^3$ is recessed to present three annular ribs or projections 2 3 4, as shown, and has a central opening which receives a bushing 5, which is screwed onto the axle $d$. The inner end of the bushing 5 projects into the recess in the shell or disk, and said projecting end is beveled, as at 7. A series of balls 6 is placed in the recess in the shell or disk, bearing against or upon the ribs or projections 2 3 and also upon the beveled end 7 of the bearing. The balls hence have three bearing-points 2 3 7, and between these points open spaces are left. The shell $c^3$, with its ribs 2 3, constitutes a ball-track. The bushing 5 is movable around and longitudinally on the axle $d$, and is hence adjustable. The collar $f$ is placed on the axle $d$ against the bushing 5, which furnishes a support for a brace-rod $f'$, and a portion of a fork $f^2$ is placed on the axle $d$ against the collar $f$, then a washer $f^3$, and lastly a nut $f^4$ is screwed onto the axle $d$ to hold the parts in place. By removing the nut $f^4$, washer $f^3$, fork $f^2$, and collar $f$, and also the bushing 5, the balls 6 will fall and be supported on the bearing-points 4 and 8, so that many of the parts, as well as the axis, may be removed, if desired, without removing the balls. By providing three bearing-points for the balls, leaving open spaces between them, the friction and consequent wear upon the balls will be reduced to the minimum. At the opposite end of the hub $a$ a ferrule-like end piece, made substantially the same as that above described and provided with similar bearings for the ball, is provided, although it does not have formed on it sprocket-teeth. With this exception it is or may be the same. The screw-threads by which the shells $c^3$ or ball-tracks are held in the respective ends of the hub are made "right-handed" on the left-hand side of the wheel, and "left-handed" on the right side of the wheel so that the running of the wheel upon its axle would tend to tighten the shells in place.

I claim—

1. The hub of a wheel and the ferrule-like end piece having sprocket-teeth $c'$, a tube upon which it is fitted which passes axially through the hub, the annular rib 8, and the annular screw-threaded flange $c^2$, combined with a recessed shell $c^3$, having annular ribs or projections 2 3 4 in the recessed portion thereof, and the bushing 5, having a beveled end 7, which enters the recessed portion of the shell $c^3$ and furnishes a bearing-point, and a series of balls contained in said recessed shell $c^3$ and normally bearing upon the points 2 3 7, but permitted to fall and be supported by the points 4 8, substantially as described.

2. The hub $a$, having on it the ferrule-like end piece provided with a flange $c^2$ and the annular rib 8, combined with a recessed shell $c^3$, having within its recessed portion three annular ribs 2 3 4, a bushing 5, adapted to be supported on the axle, its end portion being beveled, as at 7, and entering the recessed portion of the shell, and a series of balls contained in said shell, substantially as described.

3. The hub $a$, having on it the ferrule-like end piece provided with a flange, as $c^2$, combined with a recessed shell, as $c^3$, having annular ribs 2 3 in its recessed portion, and a bushing 5, arranged on the axle and entering said recessed portion of the shell to furnish an additional bearing for a series of balls contained in said recessed portion, substantially as described.

4. A hub having on it at each end ferrule-like end pieces, with flanges internally screw-threaded to receive ball-tracks, as described, the said screw-threads on one flange being cut in an opposite direction to those on the other flange, substantially as described.

In testimony whereof I have signed my name to this specification in the presence of two subscribing witnesses.

STERLING ELLIOTT.

Witnesses:
BERNICE J. NOYES,
FRANCES M. NOBLE.